United States Patent

Sundberg

[15] 3,638,693
[45] Feb. 1, 1972

[54] FOREST HARVESTER

[72] Inventor: Ulf Hjalmar Sundberg, 36, Villavagen, Stocksund, Sweden

[22] Filed: Mar. 4, 1970

[21] Appl. No.: 16,536

[52] U.S. Cl. ..................................144/3 D, 144/309 AC
[51] Int. Cl. ........................................A01g 23/02
[58] Field of Search ............143/43 N; 144/2 Z, 3 D, 34 R, 144/34 E, 309 AC

[56] References Cited

UNITED STATES PATENTS

| | | | |
|---|---|---|---|
| 2,707,008 | 4/1955 | Bannister | 144/3 D |
| 3,022,747 | 2/1962 | McIntyre | 144/34 R |
| 3,140,736 | 7/1964 | Propst | 144/3 D |

FOREIGN PATENTS OR APPLICATIONS 496,245  9/1953  Canada..................................144/34 R

*Primary Examiner*—Gerald A. Dost
*Attorney*—Sommers & Young

[57] ABSTRACT

A forest-harvesting machine of the type intended for separating standing trees, for processing the trees thus separated and for collecting the trees thus processed or parts thereof. The invention, more precisely, relates to a forest harvester comprising a mobile carrying structure which is upright in operation position and supports thereon a tree-processing arrangement comprising at least separating and limbing means, preferably also cutting and/or barking means.

11 Claims, 6 Drawing Figures

FOREST HARVESTER

BACKGROUND OF THE INVENTION

Several different harvesting machines are previously known which comprise means of different embodiments for felling, delimbing, barking and cutting. These known machines, however, have disadvantages such as, for example, that their function is obstructed by trees left standing, and that they are too large and therefore require broad pathways to advance on, which renders these machines unsuitable for use in the thinning of forests or similar operations. A further disadvantage of the conventional forest-harvesting machines is that a tree separated by the machine has to be processed or transported to a processing plant and only thereafter can the machine cut and separate the next tree.

SUMMARY OF THE INVENTION

The present invention, thus, has as its object to produce a forest-harvesting machine which is adapted to be used as effectively for clear felling as for thinning operations.

Another object of the invention is to produce a forest-harvesting machine which does not require broad pathways to advance in a suitable terrain. The off-road conditions and other factors, however, can render it difficult or impossible to utilize a forest-harvesting machine directly in the terrain, and main roads, skid roads and the like have to be prepared so that a harvester may advance thereon.

It is, therefore, an object of the invention to produce a forest harvester, which is adapted to follow such main roads or skid roads, and the action radius of which is sufficient to cover from such a skid road a relatively large area from one and the same place.

A further object of the invention is to produce a forest harvester so constructed that the tree immediately subsequent to its separation from the stump can be subjected to the processing intended.

A further object of the invention is to produce a forest harvester, which transports a separated tree so is transported out of the action area of the machine in a novel and effective manner so that the separating means directly after having separated a tree is free for separating the next tree.

These and other objects will be evident from the following description and accompanying drawings.

DETAILED DESCRIPTION OF THE EMBODIMENTS

Figure 1:
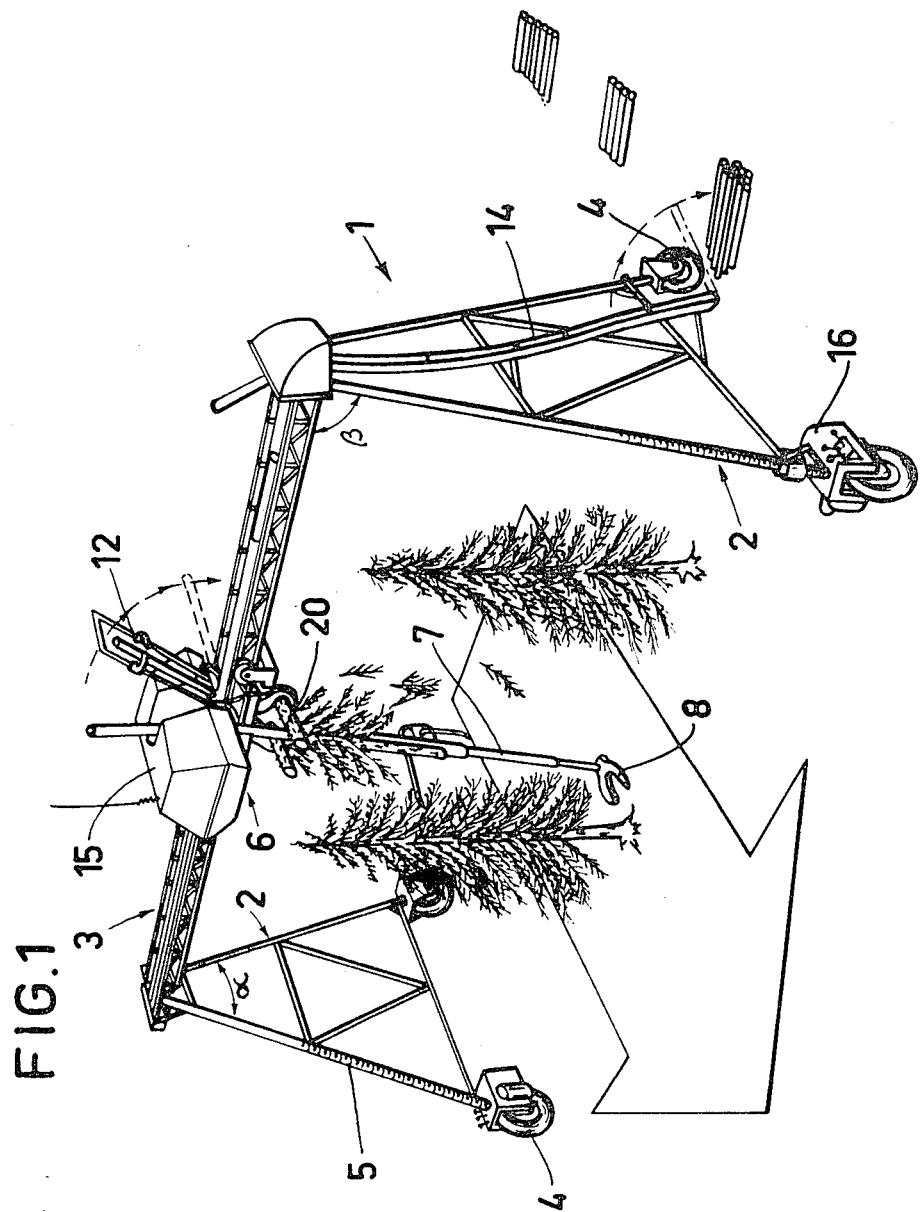
FIG. 1 is a perspective view of an embodiment of the harvester according to the invention.

According to the invention, the forest harvester comprises a chassis 1 of gantry design which includes two trestles 2 and mounted therebetween a transverse beam 3, and which is provided with one or several driven wheels 4 driven by one common motor or each wheel driven separately by its motor, which may be hydraulic, pneumatic or of another suitable construction. Each of the trestles 2 is arranged so that the angle between the legs of each trestle is adjustable so that the transverse beam during operation can be set and maintained in any desired position, preferably horizontally, and be set in the transport positions desired. The legs 5 of the trestles are also adjustable in vertical direction. The transverse beam 3, furthermore, is mounted to the trestles 2 in such a manner that it can be moved in the longitudinal direction and pivot in relation to the trestles, and that the angle between the transverse beam and the trestles can be maintained within definite limits, as appears for example from FIG. 2. One trestle or both of them may be replaced by a column structure so designed that the properties described as regards the trestle structure are maintained.

Figure 2:
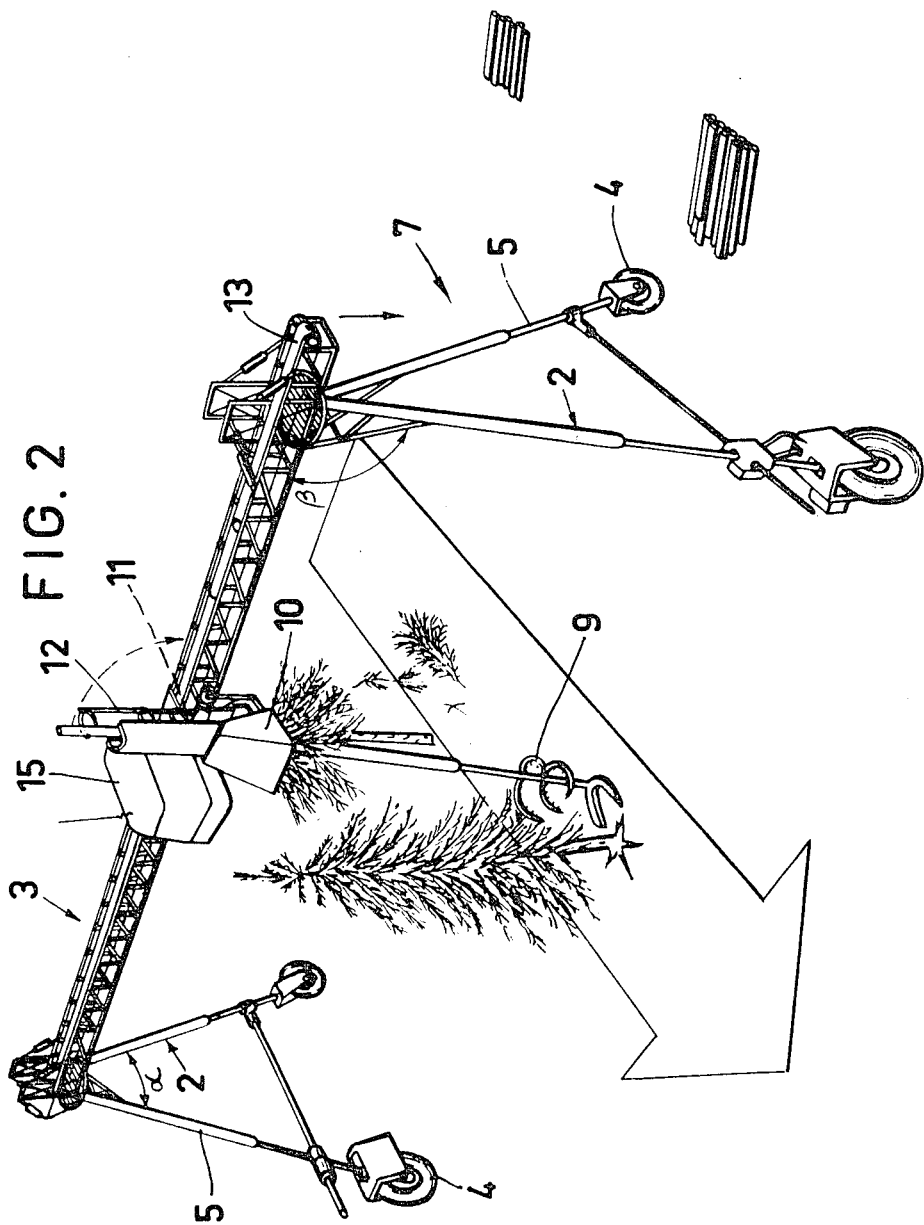
FIG. 2 is a perspective view of a second embodiment of the harvester according to the invention.
Figure 3:
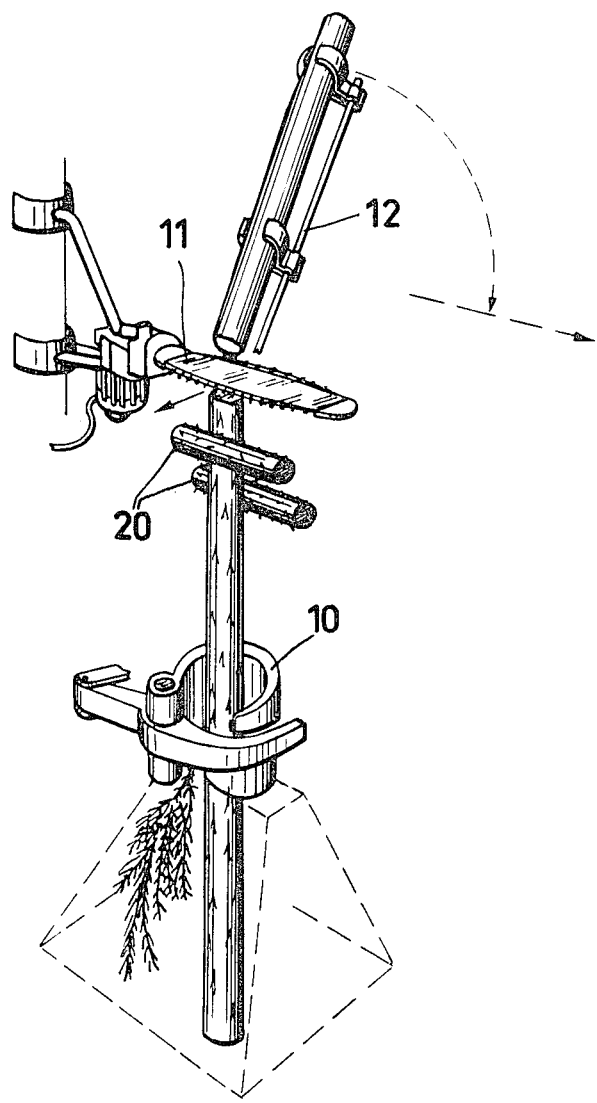
FIG. 3 shows in a schematic way part of the embodiment shown in FIG. 2.

On the transverse beam 3 according to the embodiment shown a movable tree-processing means 6 is provided, which comprises a hingedly suspended carrier member or arm 7, for example telescopic, at the free lower end of which a member 8 for the separation of trees is arranged. Said member may be of any expedient type, for example of a shears type as shown in the drawings. By means of said arm 7 which, as shown in FIG. 2, may be provided with suitable grip members 9, the tree subsequent to its separation is lifted substantially vertically so as to be caught by a pair of feed rolls 20 which feed the tree through a delimbing unit with the general designation 10 (FIGS. 2 and 3), and to a cutting station which includes a cutting unit 11 (FIG. 3) for cutting the tree to desired lengths. Said cutting unit may also be used for separating valueless tops, and said feed rolls 20 may also be designed so as to effect delimbing. In connection with the cutting station, a grip member 12 is provided, which catches the lifted trees or the portions cut off therefrom and places them on a conveyor 13 arranged on the transverse beam for effecting transport from the processing arrangement to the end of the transverse beam. When two or more tree-processing arrangements 6 are mounted movably on the transverse beam 3, preferably at least two conveyors are arranged on said beam, each conveyor opening at its end of the beam. For wood transport from the conveyor 13 to the ground a chute 14 or the like, as shown in FIG. 1, may be provided which extends to a collecting arrangement (not shown), preferably divided into boxes for different assortment ranges, where the wood is retained and formed to bundles of suitable size which thereafter are placed on the ground so as to facilitate their further transport.

The forest harvester according to the invention further comprises a power source (not shown), for example in the form of a combustion engine or the like, and every processing and transport means and unit may be provided with a separate drive or control motor or be connected to a common motor and be operated hydraulically, pneumatically or electrically, for example from a cabin 15, from a control table 16 provided at one wheel 4, or from a control table suspending from the transverse beam 3, from which the drive wheels of the machine also can be steered. The remote control used may also be of another type.

Figure 4:
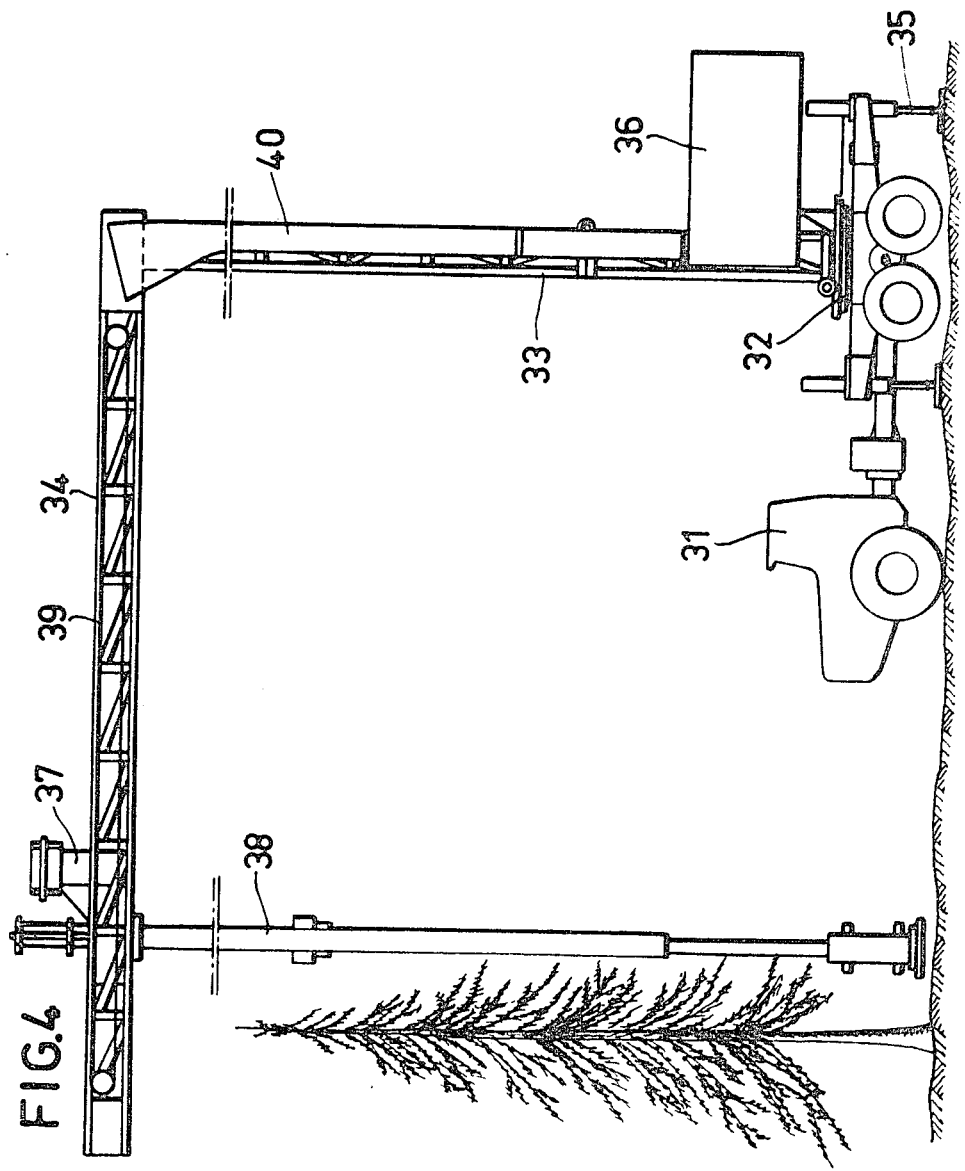
FIG. 4 shows a third embodiment of the machine according to the invention, placed in position for operation.
Figure 5:
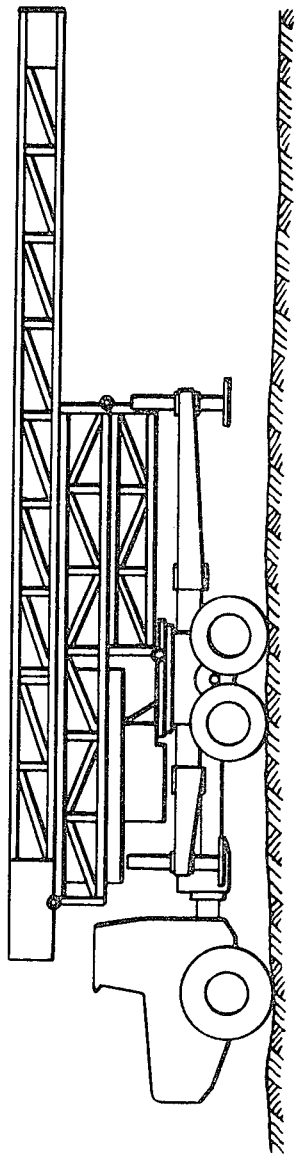
FIG. 5 shows the machine shown in FIG. 4 in a position folded down and together for short hauls and transport.
Figure 6:
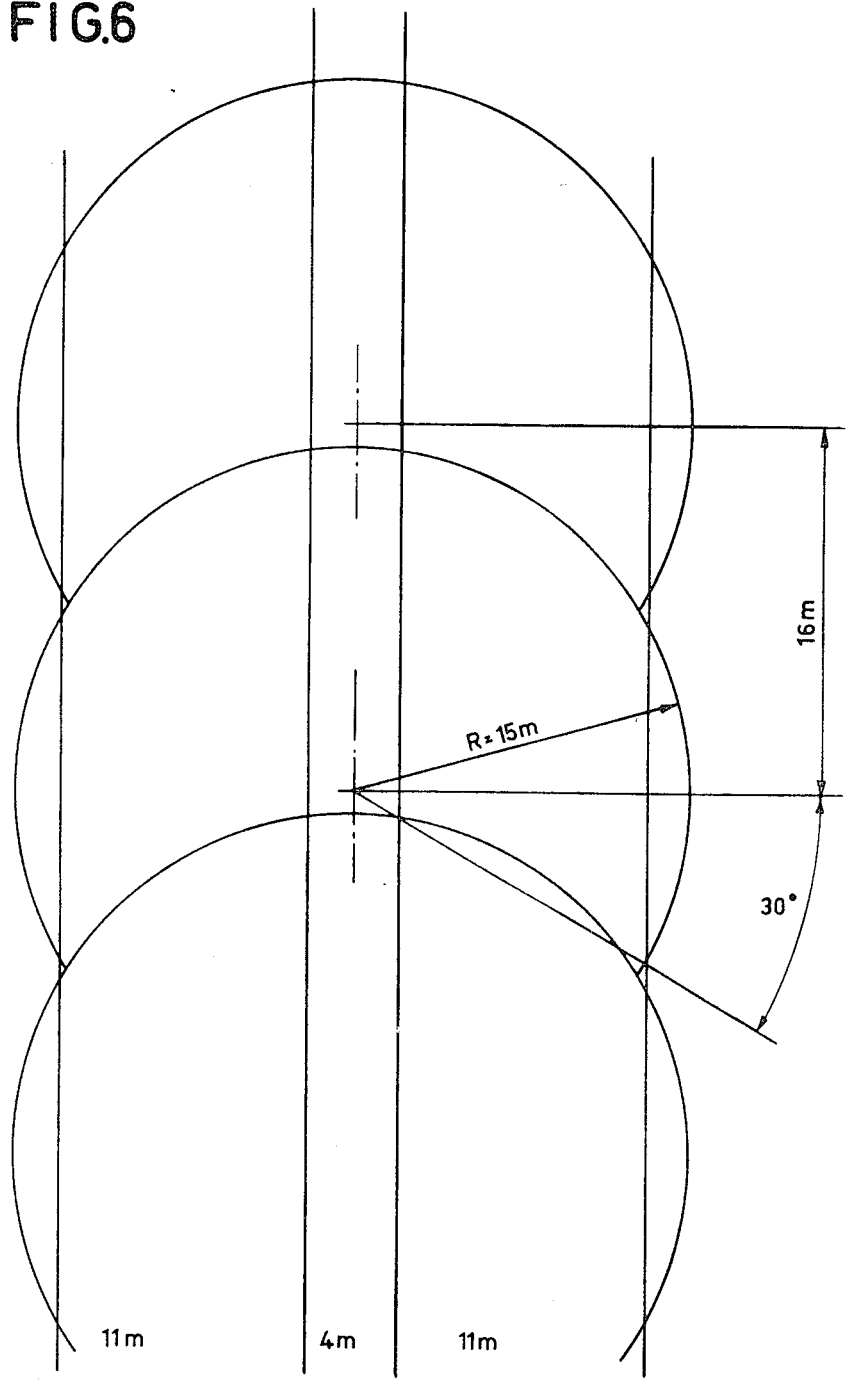
FIG. 6 shows a thinning pattern for the machine according to FIGS. 4 and 5.

In FIGS. 4 and 5 is shown in a schematic way another embodiment of the invention which comprises a forest tractor 31 constituting the base vehicle of the machine. Said tractor 31 supports on a swivel carriage 32 above the tractor bogie the tower 33 of a rotary tower crane, from the upper end of which extends a horizontal jib 34. The tractor is provided with hydraulically operated supporting legs 35 which upon erection are used for leveling the tractor and preventing its tilting over when being loaded. For like reasons the tower 33 is provided with a counterweight 36 for the jib 34.

On said jib 34 a traveling carriage 37 is mounted which carries a hingedly suspended working arm 38. Said arm may be designed as the aforementioned arm 7, and by its help trees can be separated, caught, delimbed, cut, possibly barked, and fed upwardly to a conveyor 39 in said jib 34 for being transported to a drop chute 40 mounted along the tower 33. The wood discharged from said chute can be transported away in a usual manner.

Between the places of erection, the machine usually is moved in folded state. When the machine has arrived at a place of erection, at first the supporting legs 35 are extended to operation position, in which connection they also are utilized for leveling the machine. Thereafter the tower 33 is raised by means of built-in hydraulic cylinders (not shown). The hinged drop chute 40 is folded down. Thereafter the working arm 38 is swung so as to suspend substantially vertically from the jib 34. In a stand to be thinned, for example, the working arm 38 then is moved along the jib 34 and is caused to move only small lateral distances in order to catch up trees in the separating means. Thus, the working arm can be moved quickly in the stand to be thinned and operate according to the pattern shown in FIG. 3. The pulpwood pieces processed by the working arm are transferred to the conveyor 39 and therefrom through the drop chute 40 down into a collecting box which may be combined with the counterweight 36 and can be emptied to the sides of the tractors.

When the machine is to be moved to the next place of erection, at first the required place in the extension of a skid road (FIG. 3) is cut whereafter the machine is moved to and placed in its new position. Thereafter a new cutting takes place after the pattern in FIG. 3 where also certain suitable measures are indicated.

The present invention is not restricted to what is shown and described above, but it can be varied in many different ways within the scope of the claims. It is possible, for example, in addition to the aforementioned processing units to provide further processing units, for example for the separation of valueless tops and for barking. The different processing units may either be comprised in the tree-processing arrangement or be disposed at other places of the machine, for example in connection to the collecting means. In addition to said processing units, the machine according to the invention may comprise a chipping unit and a unit for cutting off the tops of trees which otherwise would be too high.

What I claim is:

1. A forest-harvesting machine comprising,
   a mobile carrying structure which is upright in operating position,
   a beam supported by said structure,
   said beam being substantially horizontal and located at least as high as the level of the treetops during operation of the machine,
   a carrier member adapted to travel along said beam and extending vertically downward from said beam,
   tree separating means supported at the lower end of said carrier,
   means for lifting a separated tree vertically upwardly to a predetermined location,
   tree-processing means receiving each tree at said predetermined location,
   and a conveyor means for moving the processed wood along said beam and out of the working area.

2. A forest-harvesting machine according to claim 1 in which the beam in operating position is located above the treetops.

3. A forest-harvesting machine according to claim 1 in which said carrier is telescopic for lifting or lowering the tree-separating means supported at the lower end of said carrier and for lifting a separated tree.

4. A forest-harvesting machine according to claim 1 in which said beam is provided with a horizontal conveyor and said carrying structure is provided with a drop chute for wood removed from the tree-processing arrangement by said conveyor means.

5. A forest-harvesting machine according to claim 1 in which said beam is secured between a pair of legs adapted to run on the ground and constituting the carrying structure of the machine.

6. The forest-harvesting machine of claim 1 in which said tree-processing means includes means for delimbing each separated tree, for cutting each separated tree into predetermined lengths, and for barking each separated tree.

7. A forest harvesting machine comprising,
   a base vehicle,
   an extensible tower rotatably mounted on said base vehicle,
   a beam supported at the upper end of said tower in a substantially horizontal position and at a height above the treetops when said tower is extended,
   a carrier member adapted to travel along said beam and extending vertically downward from said beam,
   tree-separating means supported at the lower end of said carrier,
   means for lifting a separated tree vertically upwardly to a predetermined location,
   tree-processing means receiving each tree at said predetermined location,
   and conveyor means for moving the processed wood along said beam and out of the working area.

8. A forest-harvesting machine according to claim 7 in which said beam is provided with a horizontal conveyor and said tower is provided with a drop chute for wood removed from the tree-processing arrangement by said conveyor.

9. A forest-harvesting machine according to claim 7 in which the base vehicle is a forest tractor provided with a swiveling carriage for the tower and with hydraulically operated supporting legs.

10. A forest-harvesting machine according to claim 7 in which said carrier member is telescopic for lifting or lowering the separating means mounted at the lowermost portion of the carrier member and for lifting a separated tree.

11. The forest-harvesting machine of claim 7 in which said tree-processing means includes means for delimbing each separated tree, for cutting each separated tree into predetermined lengths, and for barking each separated tree.

* * * * *